(12) United States Patent
Yoshiya

(10) Patent No.: US 8,929,183 B2
(45) Date of Patent: Jan. 6, 2015

(54) DISK REPRODUCTION DEVICE CAPABLE OF SUPPLYING HIGH CURRENT TO LOAD DRIVER

(75) Inventor: Takashi Yoshiya, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 13/880,513

(22) PCT Filed: Oct. 28, 2011

(86) PCT No.: PCT/JP2011/074912
§ 371 (c)(1),
(2), (4) Date: Apr. 19, 2013

(87) PCT Pub. No.: WO2012/060287
PCT Pub. Date: May 10, 2012

(65) Prior Publication Data
US 2013/0219416 A1  Aug. 22, 2013

(30) Foreign Application Priority Data

Nov. 1, 2010  (JP) ................................ 2010-245038

(51) Int. Cl.
*G11B 21/08*  (2006.01)
*H02P 31/00*  (2006.01)
*G11B 17/00*  (2006.01)
*H02P 5/60*  (2006.01)

(52) U.S. Cl.
CPC ................ *H02P 31/00* (2013.01); *G11B 17/00* (2013.01); *H02P 5/60* (2013.01)
USPC ...................................................... 369/30.27

(58) Field of Classification Search
USPC ...................................................... 369/30.27
See application file for complete search history.

(56) References Cited

U.S. PATENT DOCUMENTS

| | | | |
|---|---|---|---|
| 4,467,464 A * | 8/1984 | Sugiyama et al. | 369/77.21 |
| 4,799,205 A * | 1/1989 | Maeda | 369/43 |
| 6,243,347 B1 * | 6/2001 | Kawana et al. | 720/646 |
| 6,978,467 B1 | 12/2005 | Fukushima et al. | |
| 2002/0044519 A1 * | 4/2002 | Kabasawa | 369/77.1 |

FOREIGN PATENT DOCUMENTS

| | | |
|---|---|---|
| JP | 5-344779 | 12/1993 |
| JP | 2001-143352 | 5/2001 |
| JP | 2009-189165 | 8/2009 |

OTHER PUBLICATIONS

International Search Report for International Patent Application No. PCT/JP2011/074912 (Jan. 31, 2012).

* cited by examiner

*Primary Examiner* — Tan X Dinh
(74) *Attorney, Agent, or Firm* — Fish & Richardson P.C.

(57) ABSTRACT

A load drive device (100) includes: a first terminal (LDOF) and a second terminal (LDOR) to which a load is connected; and a driver (103) which controls the terminal voltages of the first terminal (LDOF) and the second terminal (LDOR) according to an input signal (LDIN), where the driver (103) switches, based on an operation mode switching signal (MODE), between a first operation mode for driving the load by passing an output current between the first terminal (LDOF) and the second terminal (LDOR) and a second operation mode for driving the load by passing the output current both from the first terminal (LDOF) and from the second terminal (LDOR).

7 Claims, 6 Drawing Sheets

DISK REPRODUCTION DEVICE CAPABLE OF SUPPLYING HIGH CURRENT TO LOAD DRIVER

TECHNICAL FIELD

The present invention relates to a load drive device to which any one of a DC motor and a plunger can be arbitrarily connected as a load and a disk reproduction device using such a load drive device.

BACKGROUND ART

As slim disk drives incorporated in notebook personal computers and the like, there are a slot type (see FIG. 6A) that uses a DC motor to insert/remove a disk and a plunger type (see FIG. 6B) that uses a plunger to unlock a disk tray; a loading motor driver IC is required to correspond to both types.

In order to correspond to the slot type described above, it is necessary to switch the direction of an output current flowing through the DC motor according to the insertion/removal of the disk. Hence, as shown in FIG. 6A, a conventional motor driver IC 10 controls the terminal voltages of a first terminal LDOF and a second terminal LDOR according to an input signal LDIN (for example, (LDOF, LDOR)=(H, L), (L, H), (L, L)) such that an output current Iout flows through a DC motor 11 connected between the first terminal LDOF and the second terminal LDOR either in a direction from the first terminal LDOF to the second terminal LDOR or in a direction from the second terminal LDOR to the first terminal LDOF or the output current Iout does not flow in any of the directions described above.

On the other hand, in order to correspond to the plunger type described above, it is necessary to pass the output current through the plunger when the disk tray is unlocked. Hence, as shown in FIG. 6B, with a plunger 12 connected to any one of the first terminal LDOF and the second terminal LDOR, the conventional motor driver IC performs the same terminal voltage control as described above (for example, (LDOF, LDOR)=(H, L), (L, H), (L, L)).

As an example of a conventional technology related to what has been described above, there is patent document 1.

RELATED ART DOCUMENT

Patent Document

Patent document 1: JP-A-2001-143352

DISCLOSURE OF THE INVENTION

Problems to be Solved by the Invention

However, in the conventional motor driver IC 10 described above, in order to correspond to the plunger type, it is required to generate the output current Iout necessary for the drive of the plunger 12 using only any one of the first terminal LDOF and the second terminal LDOR; it is necessary to make the first terminal LDOF and the second terminal LDOR have a high current supply ability (the current supply ability that is beyond the specifications when the DC motor 11 is driven) or to connect a low current drive type plunger 12, with the result that this increases the cost of the motor driver IC 10 and the plunger 12.

In view of the foregoing problem found by the inventor of the present application, an object of the present invention is to provide, while preventing the increase in cost, a load drive device to which any one of a DC motor and a plunger can be arbitrarily connected as a load and a disk reproduction device using such a load drive device.

Means for Solving the Problem

To achieve the above object, according to the present invention, there is provided a load drive device including: a first terminal and a second terminal to which a load is connected; and a driver which controls terminal voltages of the first terminal and the second terminal according to an input signal, where the driver switches, based on an operation mode switching signal, between a first operation mode for driving the load by passing an output current between the first terminal and the second terminal and a second operation mode for driving the load by passing the output current both from the first terminal and from the second terminal (first configuration).

In the load drive device of the first configuration, in the first operation mode, the driver controls the terminal voltages of the first terminal and the second terminal according to the input signal such that the output current flows through the load connected between the first terminal and the second terminal either in a direction from the first terminal to the second terminal or in a direction from the second terminal to the first terminal or the output current does not flow through the load in any of the directions, and in the second operation mode, the driver controls the terminal voltages of the first terminal and the second terminal according to the input signal such that the output current flows through the load connected both to the first terminal and to the second terminal both from the first terminal and from the second terminal or the output current flows through the load neither from the first terminal nor from the second terminal (second configuration).

In the load drive device of the second configuration, in the first operation mode, the driver controls the terminal voltages of the first terminal and the second terminal according to the input signal such that any one of the terminal voltages of the first terminal and the second terminal is set high and the other terminal voltage is set low or both the terminal voltages are set low, and in the second operation mode, the driver controls the terminal voltages of the first terminal and the second terminal according to the input signal such that both the terminal voltages of the first terminal and the second terminal are set high or both the terminal voltages are set low or open (third configuration).

In the load drive device of the third configuration, in the first operation mode, the driver performs, according to the input signal, PWM drive on a time period during which the terminal voltages of the first terminal and the second terminal are high (fourth configuration).

The load drive device of any one of the first to the fourth configurations includes a serial interface which receives, from outside, the input signal and the operation mode switching signal as serial data (fifth configuration).

According to the present invention, there is provided a disk reproduction device including: a loading mechanism which performs loading on a disk; and the load drive device of any one of the first to fifth configurations to which the loading mechanism is connected as the load (sixth configuration).

Preferably, the disk reproduction device of the six configuration further includes a DC motor as the loading mechanism (seventh configuration).

Preferably, the disk reproduction device of the six configuration further includes a plunger as the loading mechanism (eighth configuration).

Advantages of the Invention

According to the present invention, it is possible to provide, while preventing the increase in cost, a load drive device to which any one of a DC motor and a plunger can be arbitrarily connected as a load and a disk reproduction device using such a load drive device.

BEST MODE FOR CARRYING OUT THE INVENTION

An example of the configuration in which the present invention is applied to a multichannel motor driver IC used in an optical disk reproduction device (which includes not only a reproduction-purpose machine but also a record/reproduction machine) will be described below.

Figure 1:
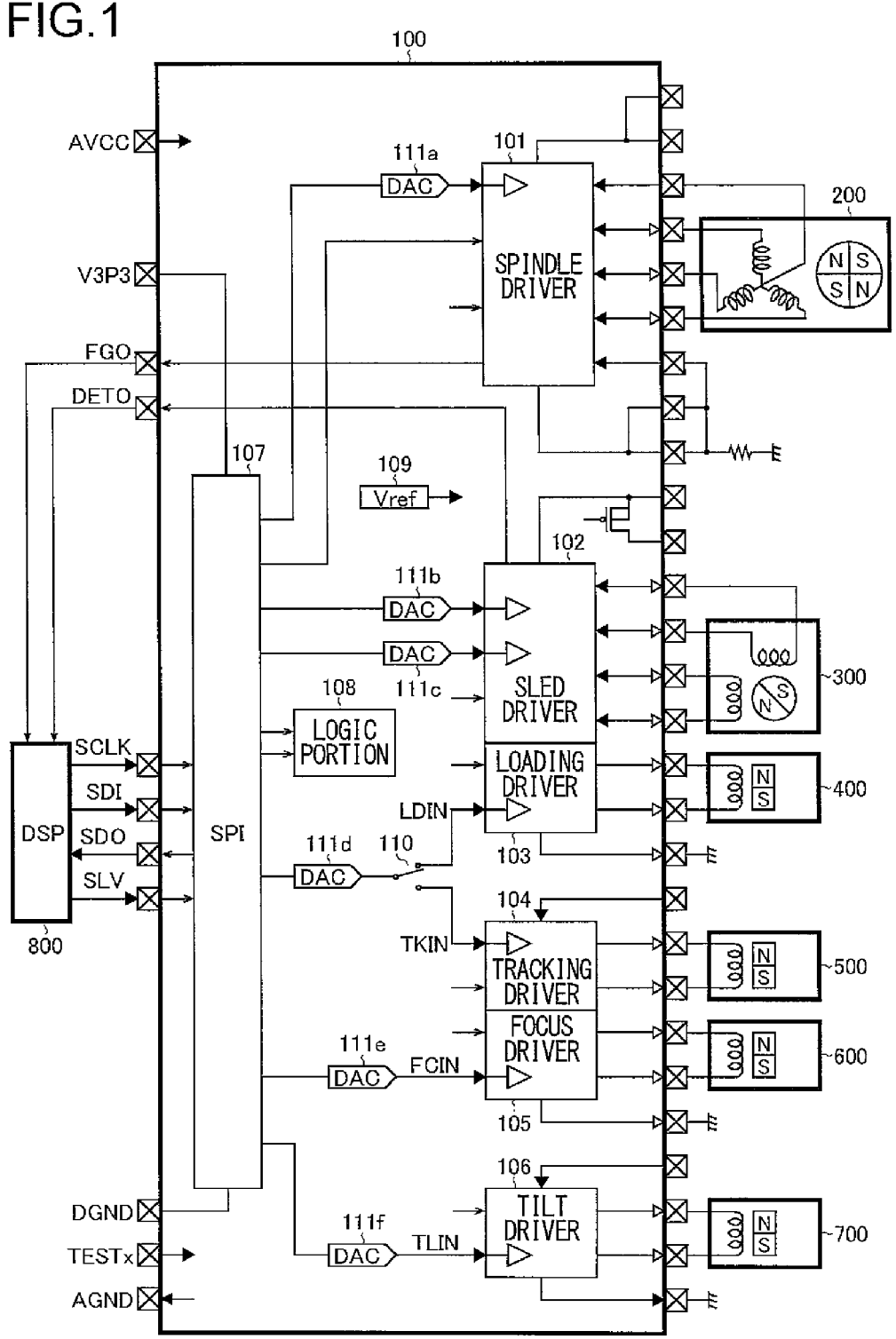
FIG. 1 A block diagram showing an embodiment of an optical disk reproduction device according to the present invention.

FIG. 1 is a block diagram showing an embodiment of an optical disk reproduction device according to the present invention. As shown in FIG. 1, the optical disk reproduction device of the present embodiment includes a multichannel motor driver IC 100, a spindle motor 200, a sled motor 300, a loading mechanism 400, a tracking servo 500, a focus servo 600, a tilt servo 700 and a DSP (digital signal processor) 800.

The motor driver IC 100 includes a spindle driver 101, a sled driver 102, a loading driver 103, a tracking driver 104, a focus driver 105, a tilt driver 106, a SPI (serial peripheral interface) interface 107, a logic portion 108, a reference voltage generation portion 109, a selector 110 and DACs (digital/analog converter) 111a to 111f; the motor driver IC 100 is a multichannel load drive device that drives, based on an instruction from the DSP 800, a plurality of loads (the spindle motor 200, the sled motor 300, the loading mechanism 400, the tracking servo 500, the focus servo 600 and the tilt servo 700).

The spindle driver 101 drives and controls the spindle motor 200. The spindle motor 200 rotates and drives an optical disk either at a constant linear speed or at a constant rotational speed. As the spindle motor 200, a brush-equipped DC motor, a three-phase brushless motor or the like can be suitably used.

The sled driver 102 drives and controls the sled motor 300. The sled motor 300 drives an optical pickup (not shown) in the radial direction of the optical disk. As the sled motor 300, a brush-equipped DC motor, a two-phase brushless stepping motor or the like can be suitably used.

The loading driver 103 drives and controls the loading mechanism 400. The loading mechanism 400 inserts/removes the optical disk for a slot type or unlocks an optical disk tray for a plunger type. As the loading mechanism 400, a brush-equipped DC motor or the like can be used suitably for the slot type or a pull-in electromagnetic plunger or the like can be used suitably for the plunger type.

The tracking driver 104 drives and controls the tracking servo 500. The tracking servo 500 drives an objective lens of the optical pickup to perform tracking control on a beam spot formed on the optical disk.

The focus driver 105 drives and controls the focus servo 600. The focus servo 600 drives the objective lens of the optical pickup to perform focus control on the beam spot formed on the optical disk.

The tilt driver 106 drives and controls the tilt servo 700. The tilt servo 700 drives the objective lens of the optical pickup to constantly keep an optical axis perpendicular to the optical disk regardless of the warpage of the optical disk or variations in inclination at the time of rotation.

Figure 2:
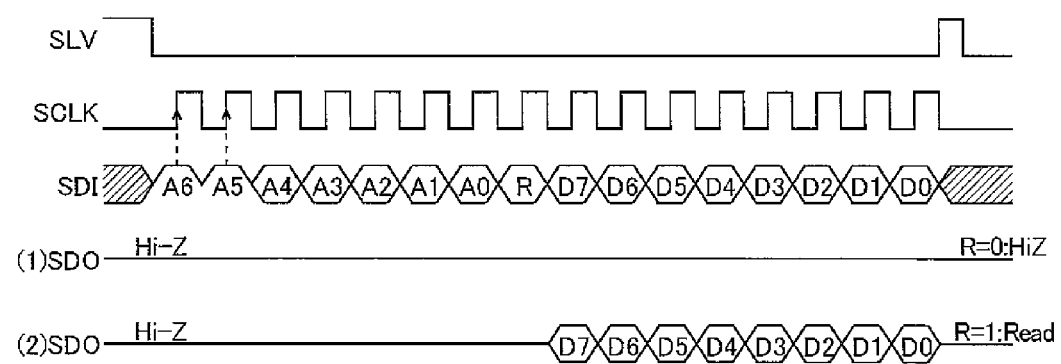
FIG. 2 A timing chart showing an example of the operation of a SPI interface 107.

The SPI interface 107 performs serial data communication with the DSP 800, which is a master, according to a predetermined protocol. FIG. 2 is a timing chart showing an example of the operation of the SPI interface 107, and shows, sequentially from above, a slave selection signal SLV, a clock signal SLK, a serial input signal SDI, a serial output signal SDO at the time of data write (R=0) and a serial output signal SDO at the time of data read (R=1).

The logic portion 108 comprehensively controls the overall operation of the motor driver IC 100 based on an instruction from the DSP 800 input through the SPI interface 107.

The reference voltage generation portion 109 generates a reference voltage Vref from a power supply voltage VCC, and feeds it to each portion of the motor driver IC 100.

The selector 110 selects to which of the loading driver 103 and the tracking driver 104 the output end of the DAC 111d is connected.

Each of the DACs 111a to 111f converts a digital signal output from the SPI interface 107 into an analog signal, and outputs it to the spindle driver 101, the sled driver 102, the loading driver 103, the tracking driver 104, the focus driver 105 and the tilt driver 106.

The DSP 800 comprehensively controls the overall operation of the optical disk reproduction device together with an unillustrated CPU (central processing unit) and the like.

Figure 3:
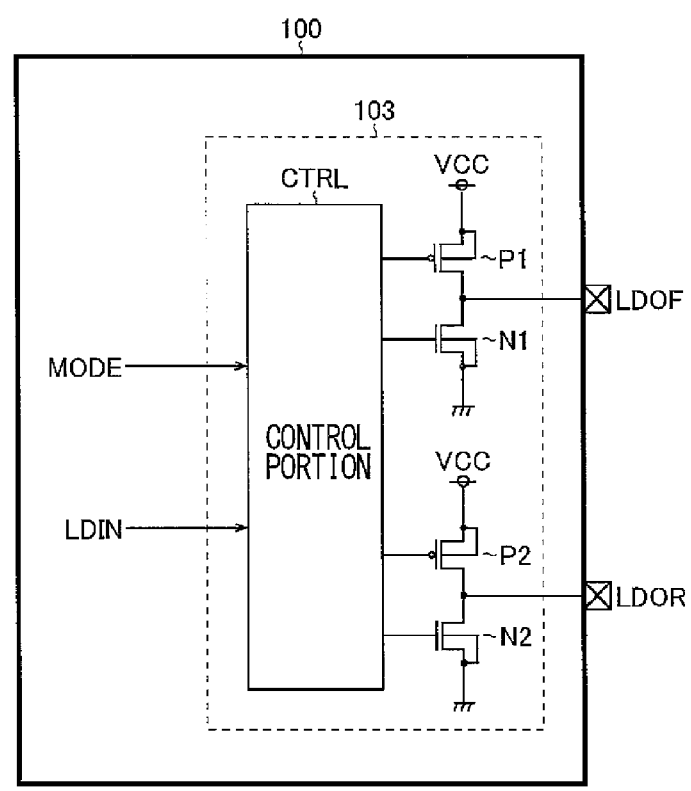
FIG. 3 A block diagram showing an example of the configuration of a loading driver 103.

FIG. 3 is a block diagram showing an example of the configuration of the loading driver 103. The loading driver 103 of the present example of the configuration includes p-channel MOS (metal oxide semiconductor) field-effect transistors P1 and P2, n-channel MOS field-effect transistors N1 and N2 and a control portion CTRL.

The source and the back gate of the transistor P1 are connected to an application end of the power supply voltage VCC. The drain of the transistor P1 is connected to a first terminal LDOF. The gate of the transistor P1 is connected to the control portion CTRL. The source and the back gate of the transistor N1 are connected to a ground end. The drain of the transistor N1 is connected to the first terminal LDOF. The gate of the transistor N1 is connected to the control portion CTRL. In other words, the transistor P1 and the transistor N1 form a totem-pole first drive stage that generates a terminal voltage of the first terminal LDOF based on an instruction of the control portion CTRL.

The source and the back gate of the transistor P2 are connected to the application end of the power supply voltage VCC. The drain of the transistor P2 is connected to a second terminal LDOR. The gate of the transistor P2 is connected to the control portion CTRL. The source and the back gate of the transistor N2 are connected to the ground end. The drain of the transistor N2 is connected to the second terminal LDOR. The gate of the transistor N2 is connected to the control portion CTRL. In other words, the transistor P2 and the transistor N2 form a totem-pole second drive stage that generates a terminal voltage of the second terminal LDOR based on an instruction of the control portion CTRL.

The control portion CTRL generates, based on the input signal LDIN and an operation mode switching signal MODE, the gate signals of the transistors P1 and P2 and the transistors N1 and N2. The input signal LDIN is input from the DSP 800 through the SPI interface 107, the DAC 111d and the selector 110 to the control portion CTRL of the loading driver 103. On the other hand, the operation mode switching signal MODE is input from the DSP 800 through the SPI interface 107 and the logic portion 108 to the control portion CTRL of the loading driver 103.

Both the input signal LDIN and the operation mode switching signal MODE described above are input from the DSP 800 utilizing the data bit of the serial input signal SDI (see the symbols D0 to D7 of FIG. 2). In this configuration, it is possible to realize the operation mode switching function of the loading driver 103 without the number of terminals of the motor driver IC 100 being unnecessarily increased.

The operation mode switching function described above refers to the function of switching, based on the operation mode switching signal MODE, between a first operation mode (MODE="H") for passing the output current Iout between the first terminal LDOF and the second terminal LDOR to drive the DC motor and a second operation mode (MODE="L") for passing the output current Iout both from the first terminal LDOF and the second terminal LDOR to drive the plunger. This operation mode switching function will be described in detail below.

Figure 4A:
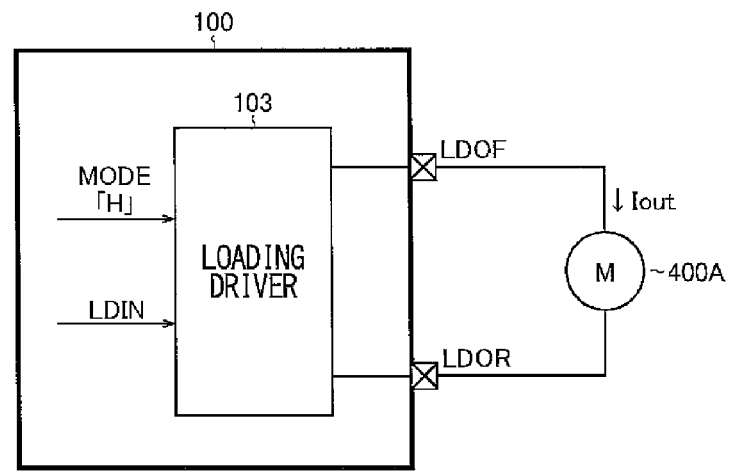
FIG. 4A A block diagram showing an example of the connection of a DC motor in the present invention.

FIG. 4A is a block diagram showing how a DC motor 400A is connected, as the slot type loading mechanism 400, between the first terminal LDOF and the second terminal LDOR and how the loading driver 103 is set at the first operation mode (MODE="H").

In the first operation mode (MODE="H"), the loading driver 103 controls the terminal voltages of the first terminal LDOF and the second terminal LDOR according to the input signal LDIN such that the output current Iout flows through the DC motor 400A connected between the first terminal LDOF and the second terminal LDOR either in a direction from the first terminal LDOF to the second terminal LDOR (Iout>0) or in a direction from the second terminal LDOR to the first terminal LDOF (Iout<0) or the output current Iout does not flow in any of the directions described above (Iout=0).

Specifically, in the first operation mode (MODE="H"), the loading driver 103 controls the terminal voltages of the first terminal LDOF and the second terminal LDOR according to the input signal LDIN such that any one of the terminal voltages of the first terminal LDOF and the second terminal LDOR is set high and the other terminal voltage is set low or both terminal voltages are set low.

Figure 5A:
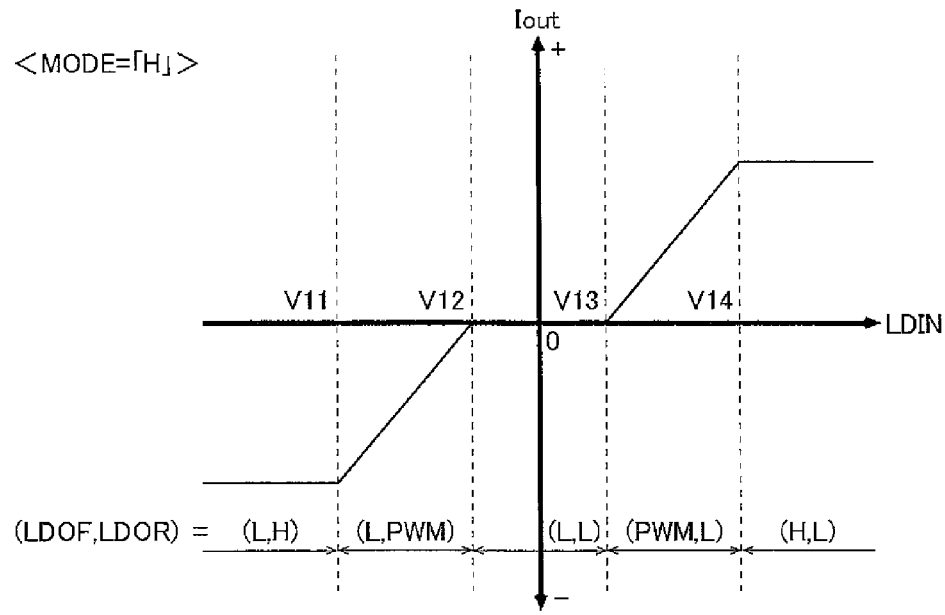
FIG. 5A An input/output characteristic diagram when MODE="H"

FIG. 5A is an input/output characteristic diagram in the first operation mode (MODE="H").

When the voltage value of the input signal LDIN is lower than V11, the loading driver 103 sets the terminal voltage of the first terminal LDOF low and sets the terminal voltage of the second terminal LDOR high (P1: off, P2: on, N1: on, N2: off). Consequently, since the output current Iout (<0) of the maximum value is passed through the DC motor 400A connected between the first terminal LDOF and the second terminal LDOR in the direction from the second terminal LDOR to the first terminal LDOF, the optical disk is subjected to loading at the maximum speed in a first direction (for example, in the insertion direction).

When the voltage value of the input signal LDIN is higher than V11 but lower than V12, the loading driver 103 sets the terminal voltage of the first terminal LDOF low, and sets the terminal voltage of the second terminal LDOR high (P1: off, P2: on (PWM drive), N1: on, N2: off). Here, the terminal voltage of the second terminal LDOR is subjected to PWM (pulse width modulation) drive such that as the voltage value of the input signal LDIN is higher, a time period during which the terminal voltage is high is prolonged. Consequently, since the output current Iout (<0) of an intermediate value corresponding to the input signal LDIN is passed through the DC motor 400A connected between the first terminal LDOF and the second terminal LDOR in the direction from the second terminal LDOR to the first terminal LDOF, the optical disk is subjected to loading at an intermediate speed corresponding to the input signal LDIN in the first direction (for example, in the insertion direction).

When the voltage value of the input signal LDIN is higher than V12 but lower than V13, the loading driver 103 sets both the terminal voltages of the first terminal LDOF and the second terminal LDOR low (P1: off, P2: off, N1: on, N2: on). Consequently, since the output current Iout (Iout=0) is not passed through the DC motor 400A connected between the first terminal LDOF and the second terminal LDOR in any of the directions described above, the loading of the optical disk is stopped.

When the voltage value of the input signal LDIN is higher than V13 but lower than V14, the loading driver 103 sets the terminal voltage of the first terminal LDOF high, and sets the terminal voltage of the second terminal LDOR low (P1: on (PWM drive), P2: off, N1: off, N2: on). Here, the terminal voltage of the first terminal LDOF is subjected to PWM drive such that as the voltage value of the input signal LDIN is higher, a time period during which the terminal voltage is high is prolonged. Consequently, since the output current Iout (>0) of the intermediate value corresponding to the input signal LDIN is passed through the DC motor 400A connected between the first terminal LDOF and the second terminal LDOR in the direction from the first terminal LDOF to the second terminal LDOR, the optical disk is subjected to loading at the intermediate speed corresponding to the input signal LDIN in a second direction (for example, in the removal direction).

When the voltage value of the input signal LDIN is higher than V14, the loading driver 103 sets the terminal voltage of the first terminal LDOF high and sets the terminal voltage of the second terminal LDOR low (P1: on, P2: off, N1: off, N2: on). Consequently, since the output current Iout (>0) of the maximum value is passed through the DC motor 400A connected between the first terminal LDOF and the second terminal LDOR in the direction from the first terminal LDOF to the second terminal LDOR, the optical disk is subjected to loading at the maximum speed in the second direction (for example, in the removal direction).

As described above, in the first operation mode (MODE="H"), it is possible to arbitrarily switch, according to the insertion/removal of the optical disk, the direction and the size of the output current Iout flowing through the DC motor 400A.

Although, with reference to FIG. 5A, the configuration where, in a period of V11<LDIN<V12 and a period of V13<LDIN<V14, the PWM control for a high-level period is performed to continuously perform variable control on the output current Iout has been described as an example, the present invention is not limited to this configuration. In the period described above, variable control may be performed stepwise (in the form of steps) on the output current Iout or the output current Iout may be fixed to one intermediate value.

Figure 4B:
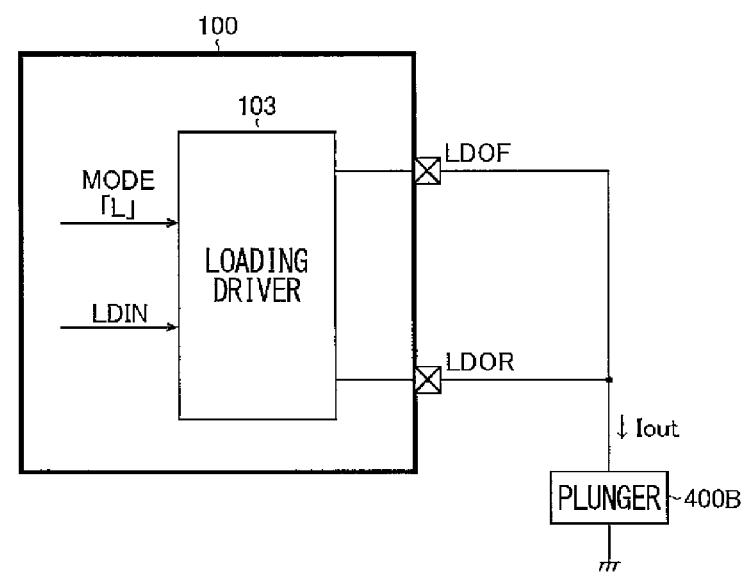
FIG. 4B A block diagram showing an example of the connection of a plunger in the present invention.

FIG. 4B is a block diagram showing how a plunger 400B is connected, as the plunger type loading mechanism 400, both to the first terminal LDOF and to the second terminal LDOR and how the loading driver 103 is set at the second operation mode (MODE="L").

In the second operation mode (MODE="L"), the loading driver 103 controls the terminal voltages of the first terminal LDOF and the second terminal LDOR according to the input signal LDIN such that the output current Iout flows through the plunger 400B connected both to the first terminal LDOF and to the second terminal LDOR both from the first terminal LDOF and from the second terminal LDOR or the output current Iout flows neither from the first terminal LDOF nor from the second terminal LDOR.

Specifically, in the second operation mode (MODE="L"), the loading driver 103 controls the terminal voltages of the first terminal LDOF and the second terminal LDOR according to the input signal LDIN such that both the terminal voltages of the first terminal LDOF and the second terminal LDOR are set high or both the terminal voltages are set low or open.

Figure 5B:
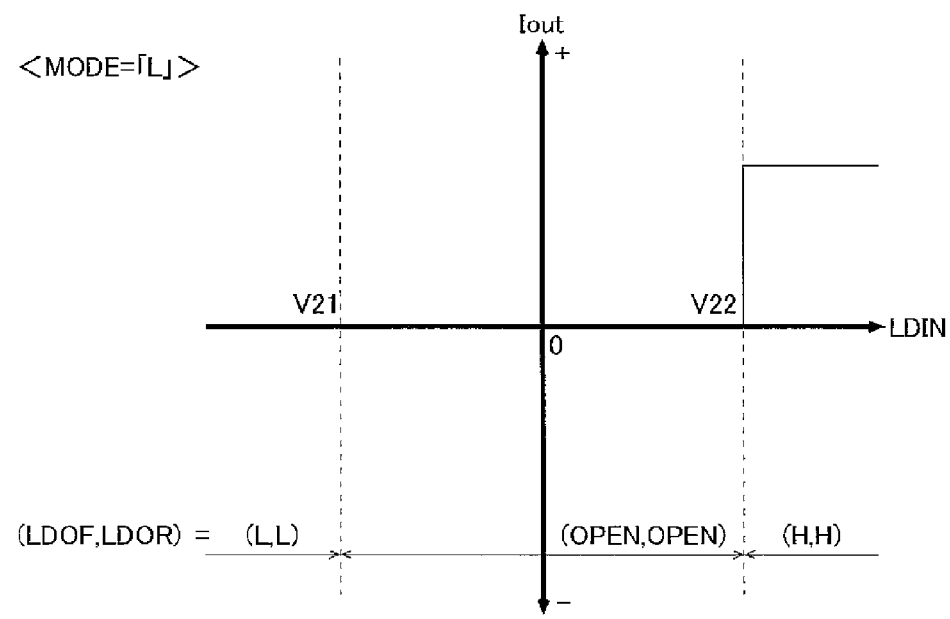
FIG. 5B An input/output characteristic diagram when MODE="L"
Figure 6A:
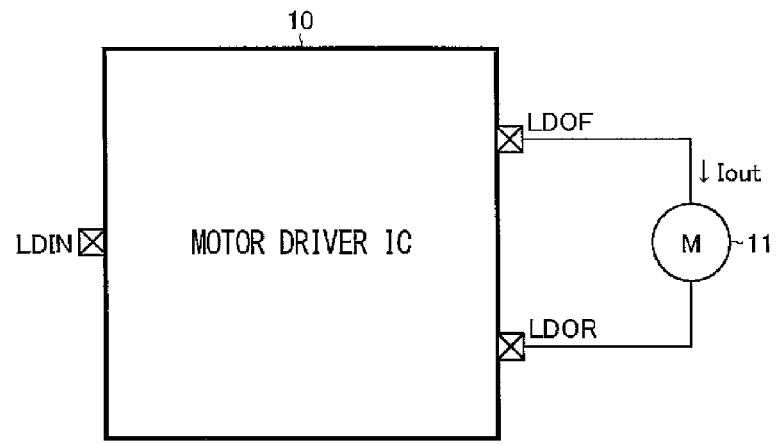
FIG. 6A A block diagram showing an example of the conventional connection of the DC motor and FIG. 6B A block diagram showing an example of the conventional connection of the plunger.
Figure 6B:
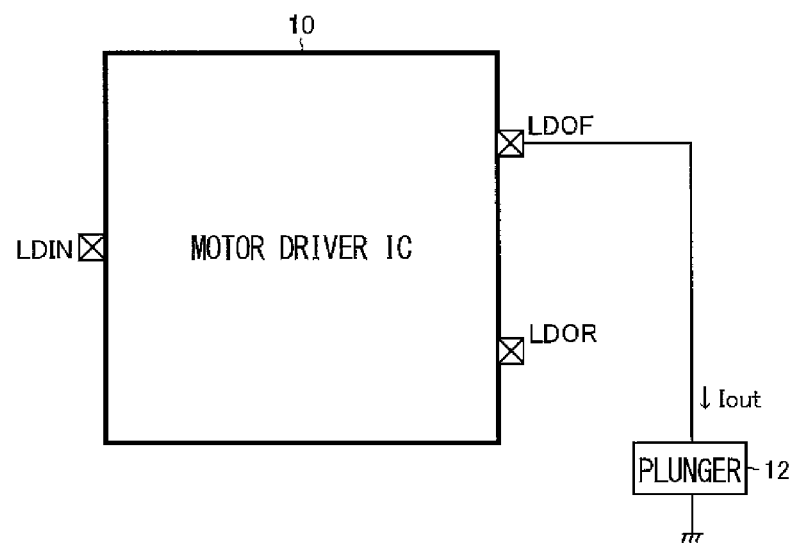

FIG. 5B is an input/output characteristic diagram in the second operation mode (MODE="L").

When the voltage value of the input signal LDIN is lower than V21, the loading driver 103 sets both the terminal voltages of the first terminal LDOF and the second terminal LDOR low (P1: off, P2: off, N1: on, N2: on). Consequently, since the output current Iout (Iout=0) flows through the plunger 400B connected both to the first terminal LDOF and to the second terminal LDOR neither from the first terminal LDOF nor from the second terminal LDOR, the plunger 400B is not driven. When the output current Iout is switched from on to off if both the terminal voltages of the first terminal LDOF and the second terminal LDOR are set low, a counter-electromotive current generated in the coil of the plunger 400B is passed through the transistors N1 and N2 to the ground end.

When the voltage value of the input signal LDIN is higher than V21 but lower than V22, the loading driver 103 sets both the terminal voltages of the first terminal LDOF and the second terminal LDOR open (P1: off, P2: off, N1: off, N2: off). Consequently, since the output current Iout (Iout=0) flows through the plunger 400B connected both to the first terminal LDOF and to the second terminal LDOR neither from the first terminal LDOF nor from the second terminal LDOR, the plunger 400B is not driven. When the output current Iout is switched from on to off, if both the terminal voltages of the first terminal LDOF and the second terminal LDOR are set open, the counter-electromotive current generated in the coil of the plunger 400B is passed through a parasitic diode associated with the transistors N1 and N2 to the ground end.

When the voltage value of the input signal LDIN is higher than V22, the loading driver 103 sets both the terminal voltages of the first terminal LDOF and the second terminal LDOR high (P1: on, P2: on, N1: off, N2: off). Consequently, since the output current Iout (Iout>0) flows through the plunger 400B connected both to the first terminal LDOF and to the second terminal LDOR both from the first terminal LDOF and from the second terminal LDOR, the plunger 400B is driven, and the disk tray is unlocked.

As described above, when the disk tray is unlocked in the second operation mode (MODE="L"), it is possible to utilize both the first terminal LDOF and the second terminal LDOR and thereby pass the output current Iout through the plunger 400B. Hence, if the power transistors (P1, P2, N1 and N2) forming the drive stage of the loading driver 103 are designed to have a conventionally equal element size, since it is possible to obtain twice the current supply ability as compared with the conventional one, it is possible to use the inexpensive plunger 400B. On the other hand, if the current supply ability of the loading driver 103 is designed to be equal to the conventional current supply ability, since it is possible to reduce the element size of the power transistors (P1, P2, N1 and N2) to half the conventional size, it is possible to reduce the cost of the chip.

If the first operation mode and the second operation mode are switched based on the operation mode switching signal MODE, since it is possible to individually set, for the single input signal LDIN, the input/output characteristic (see FIG. 5A) corresponding to the drive of the DC motor 400A and the input/output characteristic (see FIG. 5B) corresponding to the drive of the plunger 400B, it is possible to reduce a risk such as a design error.

Although in the above embodiment, the configuration where the present invention is applied to the multichannel motor driver IC has been described as an example, the target to which the present invention is applied is not limited to the multichannel motor driver IC. Naturally, the present invention can also be applied to a loading-purpose motor driver IC.

In the present invention, in addition to the above embodiment, various modifications are possible without departing from the spirit of the invention. In other words, it should be considered that the above embodiment is illustrative in all respects, not restrictive. It should also be considered that the technical scope of the present invention is indicated not by the description of the above embodiment but by the scope of claims, and that meanings equivalent to the scope of claims and all modifications within the scope are included.

INDUSTRIAL APPLICABILITY

A load drive device according to the present invention can be suitably utilized as a loading motor driver for a slim disk drive incorporated in, for example, a notebook personal computer.

LIST OF REFERENCE SYMBOLS 100 motor driver IC (load drive device)
101 spindle driver
102 sled driver
103 loading driver
104 tracking driver
105 focus driver
106 tilt driver
107 SPI interface
108 logic portion
109 reference voltage generation portion
110 selector
111a to 111f DAC
200 spindle motor 300 sled motor
400 loading mechanism
400A DC motor
400B plunger
500 tracking servo
600 focus servo
700 tilt servo
800 DSP
P1, P2 p-channel MOS field-effect transistor
N1, N2 n-channel MOS field-effect transistor
CTRL control portion

The invention claimed is:

1. A load drive device comprising:
a first terminal and a second terminal for being connected to a first load or a second load; and
a driver which controls terminal voltages of the first terminal and the second terminal according to an input signal,
wherein the driver switches, based on an operation mode switching signal, between a first operation mode for driving the first load by passing an output current flowing between the first terminal and the second terminal to the first load and a second operation mode for driving the second load by combining output currents both from the first terminal and from the second terminal and passing the combined output current to the second load.

2. A load drive device comprising:
a first terminal and a second terminal to which a load is connected; and
a driver which controls terminal voltages of the first terminal and the second terminal according to an input signal,
wherein the driver switches, based on an operation mode switching signal, between a first operation mode for driving the load by passing an output current between the first terminal and the second terminal and a second operation mode for driving the load by passing the output current both from the first terminal and from the second terminal,
wherein, in the first operation mode, the driver controls the terminal voltages of the first terminal and the second terminal according to the input signal such that the output current flows through the load connected between the first terminal and the second terminal either in a direction from the first terminal to the second terminal or in a direction from the second terminal to the first terminal or the output current does not flow through the load in any of the directions, and in the second operation mode, the driver controls the terminal voltages of the first terminal and the second terminal according to the input signal such that the output current flows through the load connected both to the first terminal and to the second terminal both from the first terminal and from the second terminal or the output current flows through the load neither from the first terminal nor from the second terminal, and
wherein, in the first operation mode, the driver controls the terminal voltages of the first terminal and the second terminal according to the input signal such that any one of the terminal voltages of the first terminal and the second terminal is set high and the other terminal voltage is set low or both the terminal voltages are set low, and in the second operation mode, the driver controls the terminal voltages of the first terminal and the second terminal according to the input signal such that both the terminal voltages of the first terminal and the second terminal are set high or both the terminal voltages are set low or open.

3. A load drive device comprising:
a first terminal and a second terminal to which a load is connected; and
a driver which controls terminal voltages of the first terminal and the second terminal according to an input signal,
wherein the driver switches, based on an operation mode switching signal, between a first operation mode for driving the load by passing an output current between the first terminal and the second terminal and a second operation mode for driving the load by passing the output current both from the first terminal and from the second terminal,
wherein, in the first operation mode, the driver controls the terminal voltages of the first terminal and the second terminal according to the input signal such that the output current flows through the load connected between the first terminal and the second terminal either in a direction from the first terminal to the second terminal or in a direction from the second terminal to the first terminal or the output current does not flow through the load in any of the directions, and in the second operation mode, the driver controls the terminal voltages of the first terminal and the second terminal according to the input signal such that the output current flows through the load connected both to the first terminal and to the second terminal both from the first terminal and from the second terminal or the output current flows through the load neither from the first terminal nor from the second terminal,
wherein, in the first operation mode, the driver controls the terminal voltages of the first terminal and the second terminal according to the input signal such that any one of the terminal voltages of the first terminal and the second terminal is set high and the other terminal voltage is set low or both the terminal voltages are set low, and in the second operation mode, the driver controls the terminal voltages of the first terminal and the second terminal according to the input signal such that both the terminal voltages of the first terminal and the second terminal are set high or both the terminal voltages are set low or open, and
wherein, in the first operation mode, the driver performs, according to the input signal, PWM drive on a time period during which the terminal voltages of the first terminal and the second terminal are high.

4. The load drive device of claim 1, further comprising: a serial interface which receives, from outside, the input signal and the operation mode switching signal as serial data.

5. A disk reproduction device comprising: a loading mechanism which performs loading on a disk; and the load drive device of claim 1 to which the loading mechanism is connected as the load.

6. The disk reproduction device of claim 5, further comprising a DC motor as the loading mechanism.

7. The disk reproduction device of claim 5, further comprising a plunger as the loading mechanism.

* * * * *